J. P. SIMPSON.
Carriage-Top Prop.
No. 209,198. Patented Oct. 22, 1878.
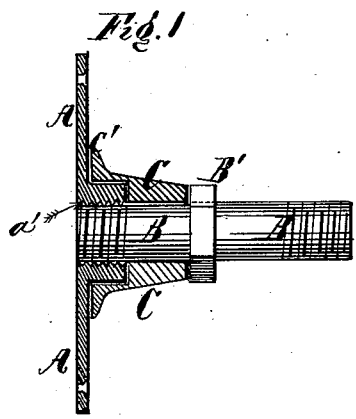
Fig. I
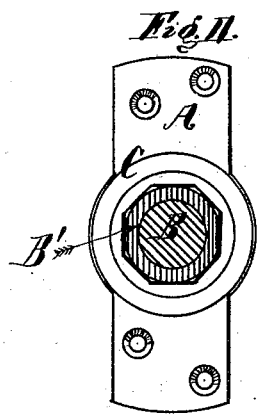
Fig. II
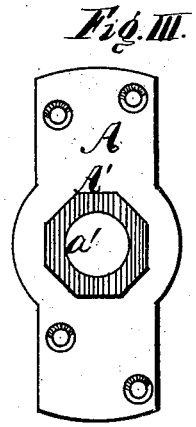
Fig. III
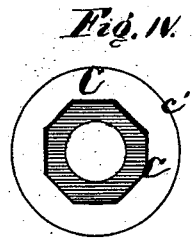
Fig. IV
Witnesses:
F. Derritt
Richard Gerner
Inventor:
J. P. Simpson.
Per:
Henry Gerner
Atty.

UNITED STATES PATENT OFFICE.

JAMES P. SIMPSON, OF CINCINNATI, OHIO.

IMPROVEMENT IN CARRIAGE-TOP PROPS.

Specification forming part of Letters Patent No. 209,198, dated October 22, 1878; application filed March 4, 1878.

*To all whom it may concern:*

Be it known that I, J. P. SIMPSON, of Cincinnati, Hamilton county, State of Ohio, have invented new and useful Improvements in Carriage-Top Props, of which the following is a specification:

This invention relates to a prop having a separate base-plate, which is to be screwed to the bow, the said base-plate having on its outer side a hexagonal boss, through the center of which is formed a threaded hole, into which is screwed a central stud, on the center of which is fixed a collar, that, when the parts are assembled, presses against the outer end of a conical sleeve that is interposed between the base-plate and the said stud-collar.

The invention will be readily understood by reference to the accompanying drawings, of which Figure I is a sectional elevation of the improved prop complete. Fig. II is a general plan of the same. Fig. III is a plan of the base-plate, showing the hexagonal boss. Fig. IV is a plan of the bottom side of the conical sleeve.

The base-plate A is a parallelogram in plan, and is pierced with holes near the ends for screws with which to fasten it to the bows of the carriage-top. On the outer side of this base-plate, and centrally located on it, is fixed a hexagonal boss, A', through the center of which boss is formed a threaded hole, a', into which is screwed a bolt or stud, B, which said stud has both of its ends threaded, the inner one of which is to be screwed into the threaded boss A' when the parts are to be assembled, and the other threads on the outer end of the said stud are for the reception of the nut that is to hold the top-braces on the stud. On the central part of the said stud is formed a collar, B', preferably made of hexagonal form, which said collar is to be used as a fixed head on the stud, by means of which it may be turned or screwed into the base-plate A.

A sleeve, C, preferably of a conically-shaped exterior, and having a hexagonal recess, c, in the interior of its base, as shown in Fig. IV, is arranged to fit on the bolt or stud B, and to embrace within its hexagonal recess c the hexagonal boss A' of the base-plate. The base of the sleeve C is widened out into a flange, c', as shown best in Fig. I. When the parts are assembled in the position for use the base-plate A is screwed to one of the bows of the top, and the covering of the bows is then drawn on and secured in place, care being taken to fit it snugly to the boss A', which will project through the said covering. The sleeve will then be put on the outside of the boss, the hexagonal parts of each easily fitting the other, and the sleeve will thereby be held in place or prevented from turning. The stud B will then be inserted into the interior cavity of the sleeve and screwed into the threaded hole in the boss of the base-plate, the collar B' resting upon the outer end of the sleeve, and forcing it down upon the base-plate, or upon the material of the cover, which is interposed between the base-plate and the base of the sleeve. This construction will prevent the sleeve from turning on the stud as the latter is screwed into place, and the tearing of the covering will thereby be avoided, and the broad flange c' of the sleeve C will prevent the entrance of rain and the consequent rotting of the cover or bow at that place.

It will be observed that my device consists of but three simple pieces, that there are only two screw-threads required, and that, owing to the peculiar arrangement of the parts, the collar B is caused to hold the thimble C down firmly upon the covering-sheet, and to afford a bearing for the inner side of the braces or stays.

I am aware that carriage-top props have been detachably connected with base-plates in various ways, and that thimbles have been used to bear upon the top or covering, and also that various devices have been used to prevent the rotation of the thimble, and these points I do not broadly claim; but What I do claim is—

1. The carriage-top prop consisting of the following members: a base-plate, A, provided with an angular neck, A', having a threaded central hole, a hollow sleeve or thimble adapted to fit closely over the angular neck, and a rod or prop, B, having threaded ends and a central collar, said prop being inserted, as shown, so that its collar bears upon and holds the sleeve.

2. In a carriage-top prop, the combination of a base provided with angular boss and threaded hole therein, the broad sleeve or washer adapted to fit closely around the angular neck and bear upon the top sheet or cover, and the prop B, having its inner end screwed into the base, its middle provided with a collar bearing on the sleeve, and its outer end threaded and adapted to receive the stay or brace.

JAMES P. SIMPSON.

Witnesses:
JOSEPH S. RIGGS,
J. L. WARTMANN.